United States Patent
Satori et al.

(10) Patent No.: US 9,470,287 B2
(45) Date of Patent: Oct. 18, 2016

(54) INVERTED LIQUID SEALED MOUNT

(71) Applicant: YAMASHITA RUBBER KABUSHIKI KAISHA, Fujimino-shi, Saitama (JP)

(72) Inventors: Kazutoshi Satori, Fujimino (JP); Yukinobu Hirano, Fujimino (JP)

(73) Assignee: YAMASHITA RUBBER KABUSHIKI KAISHA, Fujimino-Shi (JP)

( * ) Notice: Subject to any disclaimer, the term of this patent is extended or adjusted under 35 U.S.C. 154(b) by 0 days.

(21) Appl. No.: 14/387,378

(22) PCT Filed: Mar. 27, 2013

(86) PCT No.: PCT/JP2013/058988
§ 371 (c)(1),
(2) Date: Sep. 23, 2014

(87) PCT Pub. No.: WO2013/146874
PCT Pub. Date: Oct. 3, 2013

(65) Prior Publication Data
US 2015/0048562 A1    Feb. 19, 2015

(30) Foreign Application Priority Data

Mar. 31, 2012 (JP) ................................. 2012-083420

(51) Int. Cl.
*F16F 13/10* (2006.01)
*B60K 5/12* (2006.01)

(52) U.S. Cl.
CPC ........... *F16F 13/107* (2013.01); *B60K 5/1208* (2013.01); *F16F 13/10* (2013.01); *F16F 13/101* (2013.01)

(58) Field of Classification Search
CPC ...... F16F 13/10; F16F 13/105; F16F 13/107; F16F 13/108

USPC ......................................... 267/140.11, 140.13
See application file for complete search history.

(56) References Cited

U.S. PATENT DOCUMENTS 5,269,498 A * 12/1993 Bretaudeau ............. F16F 13/10
                                                    267/140.13
6,799,753 B2 * 10/2004 Okanaka ................. F16F 13/10
                                                    267/140.11

(Continued)

FOREIGN PATENT DOCUMENTS

JP         2010-266024       11/2010
JP    WO 2010143444 A1 *    12/2010    ............. F16F 13/10
JP         2011-247381       12/2011

OTHER PUBLICATIONS

International Search Report, Date of Mailing: May 28, 2013.

*Primary Examiner* — Thomas Irvin
(74) *Attorney, Agent, or Firm* — Rankin, Hill & Clark LLP

(57) ABSTRACT

In the inverted type liquid sealed engine mount in which a secondary liquid chamber is located above, an insulator protrudes in a mountain shape into a primary liquid chamber, and a resistor is provided within an annular recess section formed around the protruding portion. The resistor is mounted by insertion into an engaging recess of a lining layer and elastically supported by ribs so as to be movable in the annular recess section due to liquid flowing in the circumferential direction. A regulation gap is provided between the resistor and the insulator. Although a peculiar resonance occurs when the liquid passes through the regulation gap, the peak of the anti-resonance is decreased and the frequency is moved, since the resistor is movable.

15 Claims, 13 Drawing Sheets

(56) References Cited

U.S. PATENT DOCUMENTS

| | | | |
|---|---|---|---|
| 7,044,456 B2 * | 5/2006 | Okanaka | F16F 13/101 267/140.13 |
| 7,100,910 B2 * | 9/2006 | Okanaka | F16F 13/108 267/140.13 |
| 7,216,858 B2 * | 5/2007 | Andou | F16F 13/105 267/140.13 |
| 8,695,954 B2 * | 4/2014 | Ogawa | F16F 13/101 267/140.13 |
| 9,046,147 B2 * | 6/2015 | Tsutsumi | F16F 13/106 |
| 2003/0075848 A1 | 4/2003 | Okanaka et al. | |
| 2004/0119214 A1 | 6/2004 | Okanaka et al. | |
| 2004/0188902 A1 | 9/2004 | Okanaka et al. | |
| 2012/0091640 A1 * | 4/2012 | Ogawa | F16F 13/101 267/140.11 |
| 2012/0306135 A1 * | 12/2012 | Tsutsumi | F16F 13/106 267/140.13 |
| 2014/0246822 A1 * | 9/2014 | Tsutsumi | F16F 13/106 267/140.13 |

* cited by examiner

INVERTED LIQUID SEALED MOUNT

TECHNICAL FIELD

The present invention relates to an inverted liquid sealed mount for use in an engine mount for a motor vehicle and the like.

BACKGROUND ART

A liquid sealed engine mount for a motor vehicle is publicly known. A liquid chamber is partitioned by a partition member into a primary liquid chamber and a secondary liquid chamber. The primary liquid chamber is in communication through an orifice with the secondary liquid chamber. An insulator as a vibration isolating main body of a circular truncated cone shape faces into the primary liquid chamber. The insulator is elastically deformed by the vibration which allows the primary liquid chamber to be expanded and contracted, so that fluid resonance is created at the orifice thereby to provide the preferred dynamic characteristics of high damping and low dynamic spring.

The insulator of a circular truncated cone shape is formed in the shape of substantially a mountain along a mount axis (a central axis of the liquid sealed mount), and has an electing type and an inverted type according to projecting directions of a top of the mountain. The electing type is so formed that in the case where the vibration on the side of pressurizing the primary liquid chamber is a plus vibration (the vibration on the opposite side is a minus vibration), the top of the insulator is arranged to receive the plus vibration in the input direction of the plus vibration, while the inverted type is so formed that the top of the insulator is arranged in the same direction as the input direction of the plus vibration. Each of the electing type and the inverted type is publicly known.

This inverted type has the insulator of the truncated cone-shaped vibration isolating main body projecting into the primary liquid chamber in substantially a mountain shape. The characteristic of the inverted type is that since a piston size which is a projected area in the direction of the mount axis of the insulator becomes large, the liquid movement in response to the elastic deformation of the insulator is increased in the range of a low frequency (for example, 20 Hz or less), thereby allowing the fluid resonance (hereinafter, this fluid resonance is referred to as low frequency range resonance) to be efficiently performed whereby to improve the vibration isolating effect effectively.

Further, since a recess in substantially a V-shape in cross section is annularly formed between a periphery of the insulator and a peripheral wall of the primary liquid chamber, the fluid resonance peculiar to the inverted type occurs in an intermediate and high frequency ranges (for example, 100 Hz or more) when the liquid flows in the circumferential direction within the annular recess section (hereinafter, this fluid resonance is referred to as inverted type peculiar resonance).

By the way, it is known that since a noise is made in the intermediate and high frequency ranges due to a peak (a maximal value of dynamic spring curve) of antiresonance by this inverted type peculiar resonance, a resistor is provided in the annular recess section thereby to decrease the peak of the antiresonance and to change the resonance frequency. In the description hereunder, a minimum value of the dynamic spring curve is referred to as a bottom.

As such a resistor, there are known the type that a cylindrical separate member having a fin is inserted and fixed into an annular recess section (a patent reference 1), the type that a resistor such as rubber or the like is fixed by baking to a partition member (as an example, a patent reference 2), and the type that a resistor is integrally protruded into an annular recess section from a lining rubber provided on a wall of a liquid chamber (a patent reference 3).

PRIOR ART REFERENCES

Patent reference 1: Japanese patent No. 2839400.
Patent reference 2: Japanese patent No. 3915531.
Patent reference 3: Japanese patent laid open publication JP 2010-266024A.

DISCLOSURE OF THE INVENTION

Problem to be Solved by the Invention

In the case where such resistors have been provided, an insulator is deformed and comes into contact with the resistor whereby the resistor is extended and deformed by pressure. Therefore, the stress is concentrated on a fixing portion of the resistor and damage, etc. are likely to occur so that there is a possibility of the decrease in durability. The damage of this kind occurs in a connecting portion of the fin to a cylinder portion in the patent reference 1, and occurs in the baking portion to the partition member in the patent reference 2. Also, in the patent reference 3, the damage occurs in a base portion protruding from the lining rubber. Accordingly, it is required to improve the durability of such resistors.

Further, in the case where the resistor is integrally provided on a large-sized member (such as the cylinder member, the partition member and the lining rubber) which extends over the whole of the annular recess section, when a small change is made in only the resistor part in order to control the inverted type peculiar resonance, it is not limited to only the resistor, and a large scale change including the large-sized member is needed. Therefore, it is desired to make it possible to freely control the inverted type peculiar resonance merely by adding the small change to a support portion of the resistor. The present invention is made for meeting the above-referred requirements.

Means for Solving the Problem

To solve the above described problems, according to a first aspect of the present invention, there is provided an inverted liquid sealed mount comprising an inner member being mounted on one of a vibration source side member and a vibration receiving side member, an outer member surrounding the inner member and being mounted on the other of the vibration source side member and the vibration receiving side member, an insulator of a circular truncated cone shape covering one end opening section of the outer member and elastically connecting the inner member and the outer member, a liquid chamber being formed between the insulator and a diaphragm which cover the other end opening section of the outer member, a partition member separating the liquid chamber into a primary liquid chamber and a secondary liquid chamber, an orifice communicating between the primary liquid chamber and the secondary liquid chamber, and a top of the insulator projecting into the primary liquid chamber in an input direction of vibration which pressurizes the primary liquid chamber, wherein a resistor is arranged in an annular recess section formed around the insulator within the primary liquid chamber and narrows a portion of the annular recess section so as to form a regulation gap, and the resistor is mounted by engagement with an elastic support section provided within the primary liquid chamber.

According to a second aspect of the present invention, in addition to the first aspect, the engagement between the resistor and the elastic support section is made by fits between an engaging projection and an engaging recess, and one of the engaging projection and the engaging recess is provided on the resistor while the other is provided on the elastic support section.

According to a third aspect of the present invention, in addition to the first or second aspect, the resistor is supported by being held between the partition member and the insulator such that the resistor comes in contact at an end thereof with the partition member and at the other end thereof with a portion of the insulator located in a bottom portion of the annular recess section, in the direction of a mount axis.

According to a fourth aspect of the present invention, in addition to any of the first to third aspects, the resistor is integrally provided with the engaging portion relative to the elastic support section, and with a circumferential extension protruding from the engaging portion in the circumferential direction of the annular recess section, wherein the circumferential extension extends in a circular arc shape along an outer periphery of the insulator.

According to a fifth aspect of the present invention, in addition to any of the first to fourth aspects, the resistor is made of an elastic body, and a bottom and peak of a dynamic spring curve occur in the vicinity of resonance peculiar to an inverted type when the resistor resonates by an internal pressure fluctuation created in the primary liquid chamber due to deformation of the insulator.

According to a sixth aspect of the present invention, in addition to any of the first to fifth aspects, the resistor is provided integral with a stopper portion which contacts the outer member side.

According to a seventh aspect of the present invention, in addition to any of the first to sixth aspects, the resistor is provide in pairs at opposite sides in a radial direction across the insulator, and a gap of one regulation gap is different from that of the other regulation gap.

Effects of the Invention

According to the first aspect of the present invention, since the resistor is mounted by engagement with the elastic support section provided within the primary liquid chamber, the resistor is elastically supported by the elastic support section, so that the efficiency of the fluid resonance in the inverted type peculiar resonance can be lowered and the resonance control can be performed so as to change the resonance frequency. As a result, the peak of the anti-resonance can be decreased and the resonance frequency can be moved whereby to improve the dynamic characteristic in the intermediate and high frequency ranges.

Moreover, since the resistor is detachably mounted by engagement with the elastic support section, the resistor is relatively movable within the engaging portion of the elastic support section. Therefore, even if the resistor bears a heavy load repeatedly by contact with the deformed insulator, the stress is not concentrated on the engaging portion between the resistor and the elastic support section whereby to improve the durability.

Further, a degree of the elastic support of the resistor can be adjusted such that in the case of weakening the support, the fluid resonance can be moved to the high frequency side while in the case of strengthening the support, the fluid resonance can be moved to the low frequency side. Thus, the frequency of the fluid resonance can be controlled by changing the strength and weakness of the elastic support.

In addition, the resonance can be controlled merely by such a minor alteration as to change the strength of the support section, whereby it is possible to simplify the control of the inverted type peculiar resonance.

Moreover, since the resistor is detachably mounted, the replacement of the resistor can be easily done in accordance with the specification thereby to increase the degree of freedom of the resonance control.

According to the second aspect of the present invention, since one of the engaging projection and the engaging recess which constitute the engaging section is provided on the resistor while the other is provided on the elastic support section, the resistor can be easily mounted by engagement, and the elastic support by the elastic support section can be carried out.

According to the third aspect of the present invention, since the resistor is fixed by being held between the partition member at one end thereof and the insulator at the other end thereof in the axial direction of the mount axis, it is supported by engagement as above, and the support strength can be controlled by adjustment of interference between the partition member and the insulator.

According to the fourth aspect of the present invention, since the resistor is integrally provided with the circumferential extension protruding in a circular arc shape from the engaging projection in the circumferential direction of the insulator, the circumferential extension is allowed to extend along a certain length thereof in the circumferential direction of the insulator, whereby the regulation gap formed as a gap between the insulator and the resistor can be adjusted in the circumferential direction.

Moreover, since the resistor is detachably engaged and separated from the partition member, etc., the change thereof can be facilitated. Therefore, by changing one of the resistor with the others having various circumferential extension lengths, the peak of the anti-resonance can be controlled by controlling the inverted type peculiar resonance, whereby to increase the degree of freedom of control.

In addition, when the length of the resistor in the radial direction of the insulator is adjusted, the width of the regulation gap can be freely adjusted, whereby it is also possible to control the inverted type peculiar resonance. Therefore, the degree of freedom in the control of the inverted type peculiar resonance is increased.

According to the fifth aspect of the present invention, the inverted type peculiar resonance occurs within the annular recess section by the internal pressure fluctuation created in the primary liquid chamber due to deformation of the insulator, so that there are created the bottom and peak of the dynamic spring curve. Then, the resistor is made of an elastic body and the resistor itself resonates by the internal pressure fluctuation created in the primary liquid chamber (this resonance shall be referred to as a single resonance), thereby being configured to create the bottom and peak of the dynamic spring curve in the vicinity of the inverted type peculiar resonance. Therefore, in the dynamic spring curve there are created the bottom and peak by the single resonance of the resistor as well as the bottom and peak of the inverted type peculiar resonance, so that it is possible to decrease the dynamic spring in the intermediate and high frequency ranges. In addition, when altering material (elastic coefficient), size, shape, etc. of the resistor, the single resonance of the control member can be freely controlled. When the resistor is formed of a single elastic body, the manufacture and handling are facilitated.

According to the sixth aspect of the present invention, the resistor is provided integral with the stopper portion. Therefore, in the case where the inner member and the insulator are displaced excessively in the radial direction, the stopper portion contacts the outer member side so as to stop the excessive displacement of the inner member and the insulator, whereby the resistor can function as a stopper. Further, when the resistor is formed of a single elastic body, the resistor can be provided integral with the stopper portion According to the seventh aspect of the present invention, the resistor is provided in pairs on the opposite sides in the radial direction, and the gap of one regulation gap is different from that of the other regulation gap. Therefore, in the case where a pair of resistors is arranged in front and in the rear, for example, the backward movement of the insulator creates the fluid resonance on the rear side by the resistance of the regulation gap on the backward side, while the forward movement thereof creates the fluid resonance on the front side by the resistance of regulation gap on the forward side. Then, since the front and rear regulation gaps are different, the front and rear resonance is created at two different frequencies having different resonance efficiency.

Further, in the case where the front resonance and the rear resonance are the same, the fluid resonance overlaps each other so as to develop a large fluid resonance. However, in the present invention, since the front fluid resonance is different from the rear fluid resonance, the size of the resonance is reduced by substantially half in comparison with the case where the front fluid resonance is identical with the rear fluid resonance, and the fluid resonance extends over the two different resonance frequencies whereby the fluid resonance is broadened. Accordingly, the peak of the antiresonance can be lowered largely. In addition, since the control of each fluid resonance is performed merely by adjusting each of the gaps, the easy and free adjustment can be carried out.

BEST MODE FOR CARRYING OUT THE INVENTION

Hereinafter, the embodiments formed as an inverted liquid sealed engine mount for a motor vehicle will be described with reference to the accompanying drawings. FIGS. 1 to 9 relate to a first embodiment.

In the following description, the direction parallel to a mount axis MJ is referred to as an input direction Z of a main vibration to be isolated, and orthogonal biaxial directions orthogonal to the mount axis MJ are referred to as X·Y.

Moreover, with respect to the direction when being mounted on the vehicle, a Z direction designates an upward and downward direction, an X direction designating a forward and backward direction, and a Y direction designates a right and left direction. In addition, the direction orthogonal to Z is referred to as a radial direction, and the direction around Z is referred to as a circumferential direction.

Figure 1:
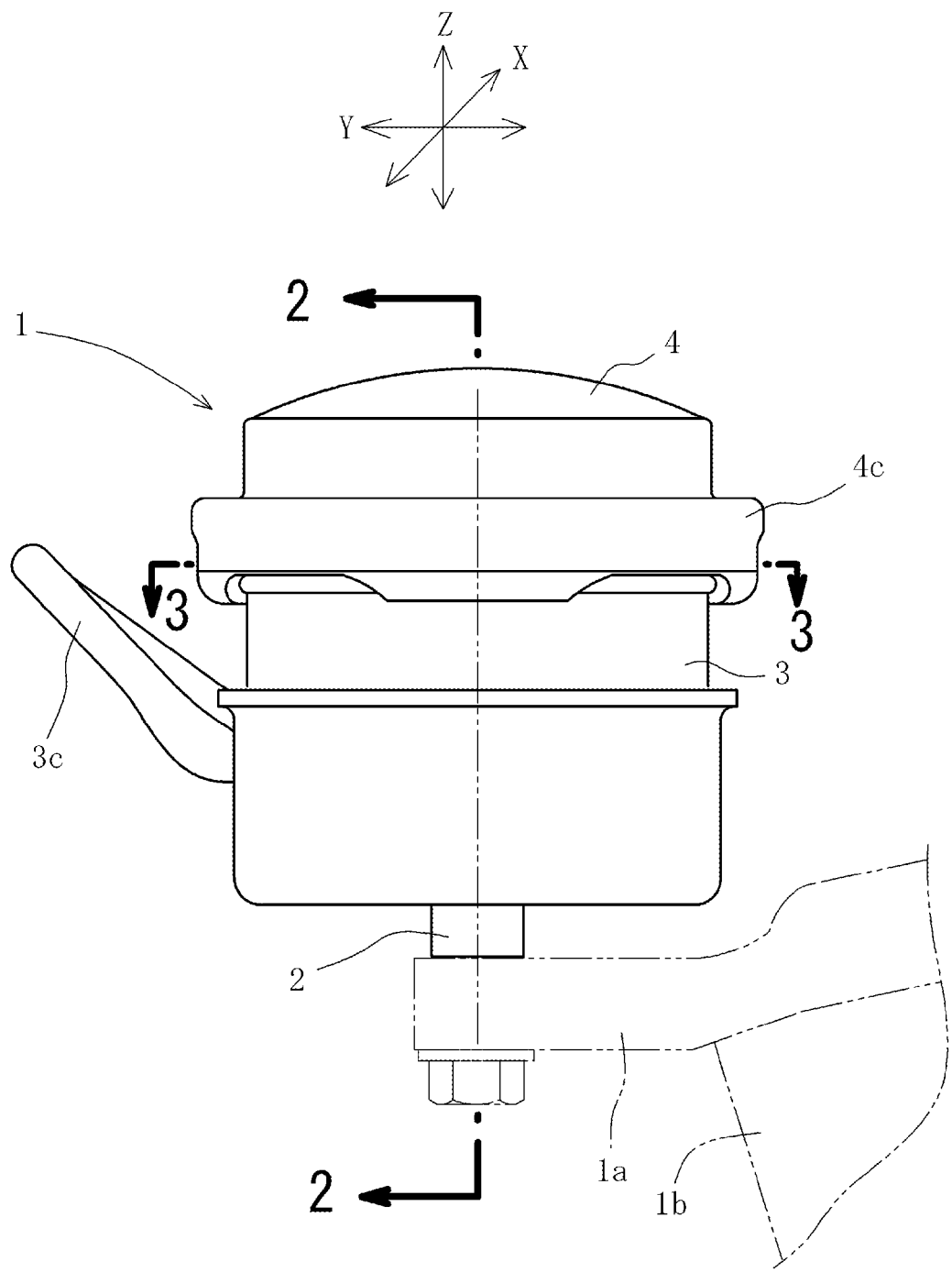
FIG. 1 is a side view of an engine mount according to a first embodiment.

FIG. 1 is a cross sectional view of an engine mount 1 taken along the mount axis MJ. This engine mount 1 is an inverted type and has an inner mounting member 2 extending downwardly to be mounted through an engine hanger 1a on an engine 1b. A cylindrical outer member 3 surrounding the inner mounting member 2 and being provided coaxial therewith is mounted through a bracket 3c on a vehicle body. The mount axis MJ extends in the upward and downward direction.

In the inverted engine mount 1, since it is possible to shorten the engine hanger 1a, elastic resonance frequencies at a fastening portion between the inner mounting member 2 and the engine hanger 1a, and at a fastening portion between the engine hanger 1a and the engine 1b can be fixed at high level, and it is possible to raise a degree of rigidity.

Figure 2:
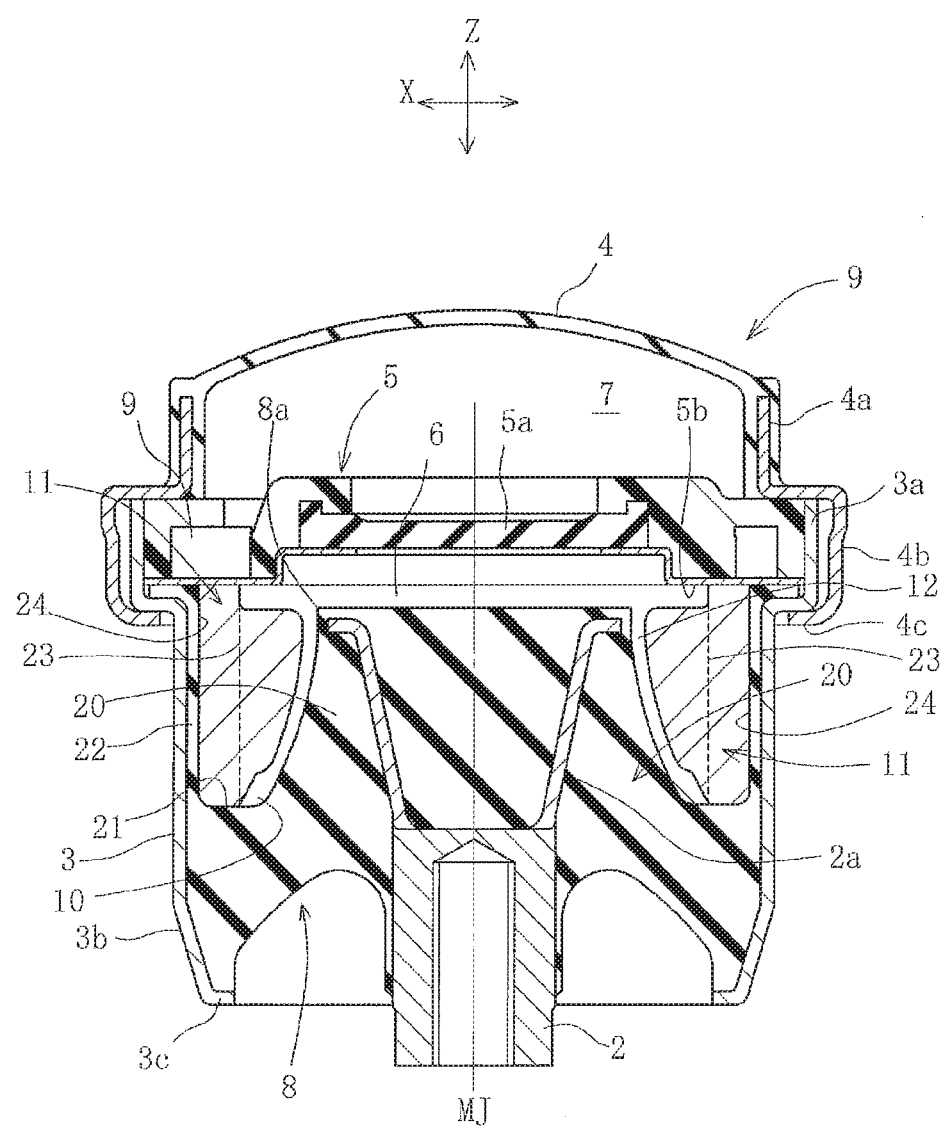
FIG. 2 is a cross sectional view taken on line 2-2 of FIG. 1.
Figure 3:
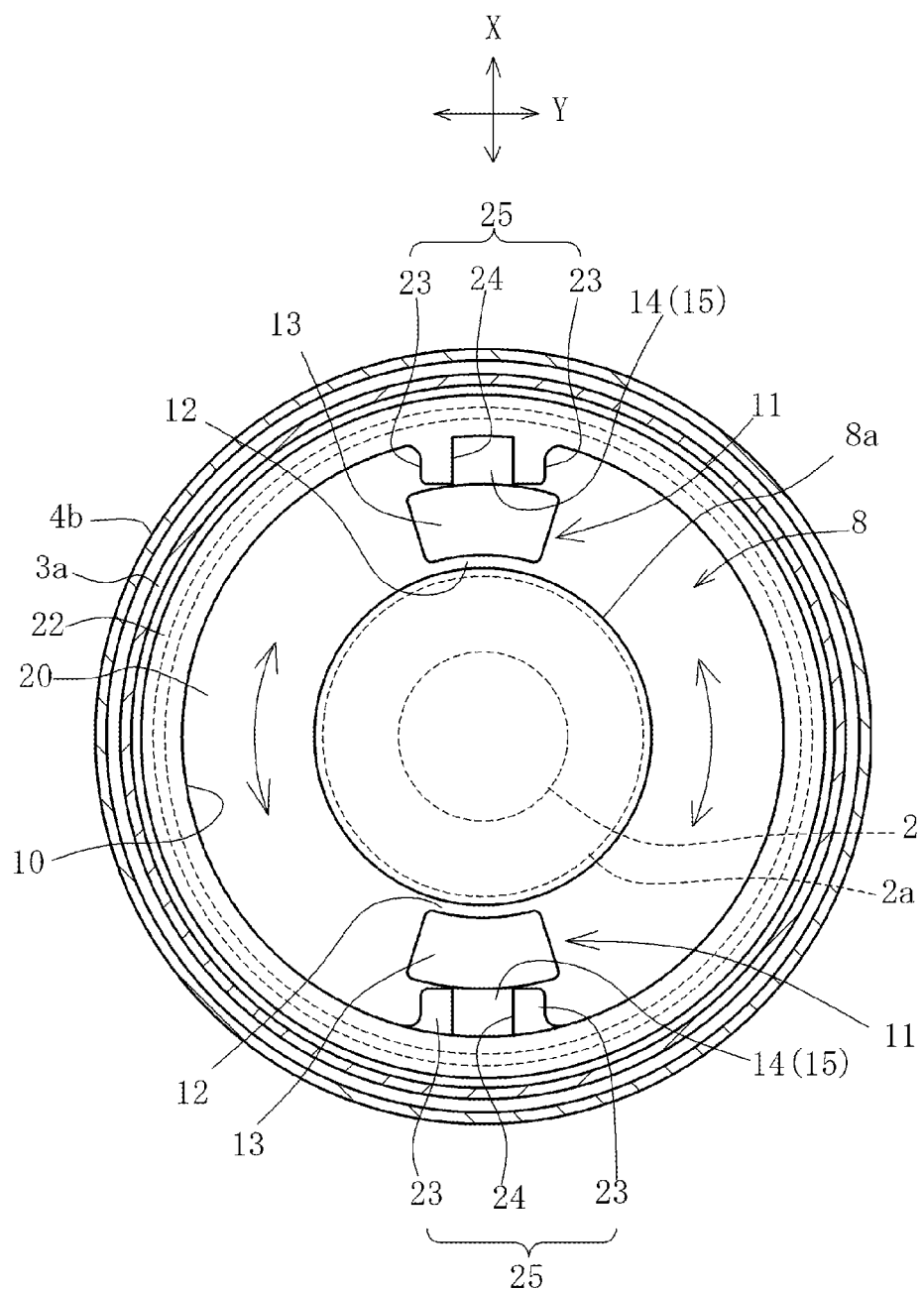
FIG. 3 is a cross sectional view taken on line 3-3 of FIG. 1.

FIG. 2 is a cross sectional view taken along line 2-2 of FIG. 1, and FIG. 3 is a cross sectional view taken along line 3-3 of FIG. 1.

Referring first to FIG. 2, the inner mounting member 2 is formed in a pipe shape with a thread groove and provided integral with a cup member 2a or connected integrally to the cup member 2a by mutual connection between separate members. The cylindrical outer member 3 is arranged to coaxially surround the inner mounting member 2. An insulator 8 is provided between the outer member 3 and each of the inner mounting member 2 and the cup member 2a.

The insulator 8 as a vibration isolating main component is made of proper elastic body such as rubber, etc., and, in the cross section illustrated in the drawing, is formed in substantially a mountain shape. A top 8a of the insulator 8 is in the shape of a circular truncated cone projecting upwardly in a primary liquid chamber 6. The insulator 8 establishes the elastic connection among the inner mounting member 2, the cup member 2a and the outer member 3. In the insulator 8 of this example, vulcanization adhesion is applied to outer surfaces of the inner mounting member 2 and the cup member, and to an inner surface of the outer member 3.

A lower end opening of the outer member 3 is closed with the insulator 8, while an upper end opening of the outer member 3 is closed with a diaphragm 4. Hence, an enclosed space surrounded by the insulator 8 formed integral with the inner mounting member 2 and the cup member 2a, by the outer member 3 and by the diaphragm 4 forms a liquid chamber hermetically filled with incompressible fluid.

The liquid chamber is partitioned by a partition member 5 into an upper chamber and a lower chamber in the drawing. The lower chamber on the side of the insulator 8 is the primary liquid chamber 6 and the upper chamber on the side of the diaphragm 4 is a secondary liquid chamber 7. The primary liquid chamber 6 and the secondary liquid chamber 7 communicate with each other through a low frequency orifice 9 provided in the partition member 5. The low frequency orifice 9 fluid-resonates in a low frequency range whereby to decrease the dynamic spring and to increase the damping in the low frequency range.

Further, in the partition member 5, there is provided an elastic diaphragm 5a which absorbs the internal pressure fluctuation of the primary liquid chamber 6 whereby to decrease the dynamic spring in the higher frequency range in which the low frequency orifice 9 is not functioning.

The partition member 5 has a larger diameter than the outer member 3 and is fitted into an enlarged diameter section 3a formed on the side of the upper end opening of the outer member 3. When an enlarged diameter section 4b of a diaphragm bracket 4a provided integral with an outer periphery of the diaphragm 4 is overlapped with the enlarged diameter section 3a from outside and when a tip 4c of the diaphragm bracket 4a is folded back inwardly, the outer member 3, the partition member 5 and the diaphragm 4 are assembled and united with one another.

A lower section of the outer member 3 forms an inwardly inclined taper section 3b with an inside of which an outer peripheral end of the insulator 8 is integrally united. In addition, a lower end of the taper section 3b is folded back inwardly to support a lower end on the outer peripheral side of the insulator 8 thereby preventing the insulator 8 from coming off.

A section of the insulator 8 which connects the inner mounting member 2, the cup member 2a and the outer member 3 forms a main body section 20 which inclines while narrowing in the upward direction. An upper surface of the main body section 20 is provided with a curved surface forming a recess section of substantially a V-shaped cross section in cooperation with the outer member 3.

This recess section forms an annular recess section 10 which surrounds annularly a periphery of the upper surface of the insulator 8. The annular recess section 10 forms a portion of the primary liquid chamber 6 and is connected continuously to the primary liquid chamber 6. An outer peripheral portion of the upper surface of the insulator 8 forms a lowermost portion 21 of the annular recess section 10.

On an inner surface of the outer member 3 facing the annular recess section 10, a lining layer 22 which is a thin film layer of an elastic body continuous from the main body section 20 is integrally formed.

An inner peripheral portion of the insulator 8 continuously enters an interior of the cup member 2a so that the cup member 2a is integrally embedded in the insulator 8. The top 8a of the insulator 8 is also a top of the cup member 2a. It is optional that the whole interior of the cup member 2a is filled integrally with a continuous part of the insulator 8, and this embodied example is formed in this way.

In the annular recess section 10, a resistor 11 is accommodated between an outer peripheral portion of the partition member 5 and the lowermost portion 21. The resistor 11 forms a partially narrow portion in a liquid channel in a circumferential direction of the annular recess section 10, and is a means for allowing this partially narrow portion to function as a regulation gap 12.

As shown in FIG. 3, the resistor 11 is provided in pairs at 180° intervals at opposite sides across the insulator 8. The resistors 11 are arranged in the forward and backward direction in this embodiment.

In this embodiment, the resistor 11 comes in close contact with the lining layer 22 of an outward portion in the radial direction of the insulator 8. An inward portion of the resistor 11 forms the predetermined regulation gap 12 in cooperation with the upper surface of the insulator 8. By the way, the regulation gap 12 may be formed between the resistor 11 and the outer member 3 by attaching the resistor 11 to the insulator 8 side.

Figure 4:
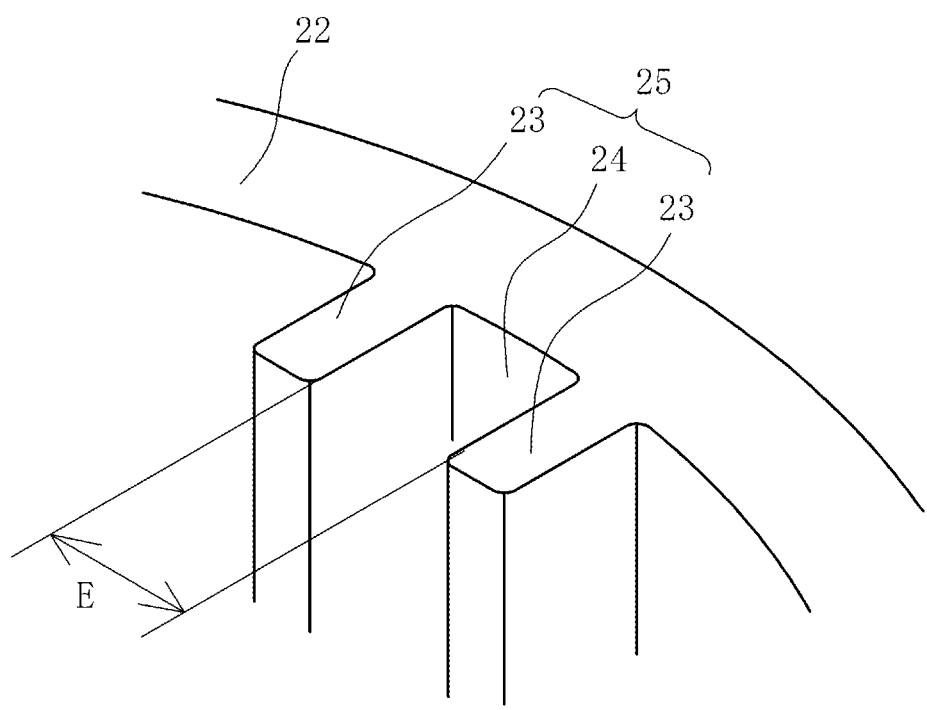
FIG. 4 is a perspective view of an elastic support section viewed from an interior of an outer cylinder.

FIG. 4 is a perspective view of an elastic support section 25 viewed from an interior of the outer member 3. A pair of ribs 23 extending in parallel in the upward and downward direction is formed integral with the lining layer 22. Between the ribs 23 there is formed an engaging recess 24 of a vertical groove shape. The ribs 23 and the engaging recess 24 constitute the elastic support section 25 formed on the side of the outer member 3. A lower portion of each of ribs 23 is connected to the lowermost portion 21 forming the upper surface of the insulator 8.

Figure 5:
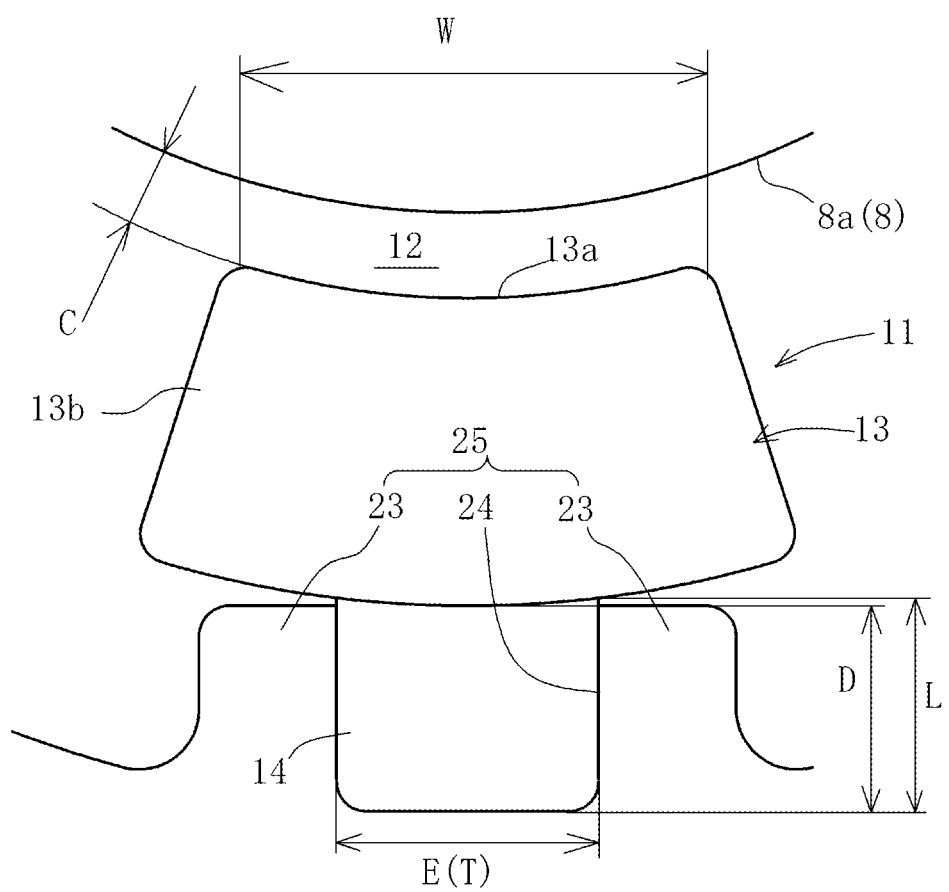
FIG. 5 is an enlarged view of a region around one of resistors in FIG. 3.
Figure 6:
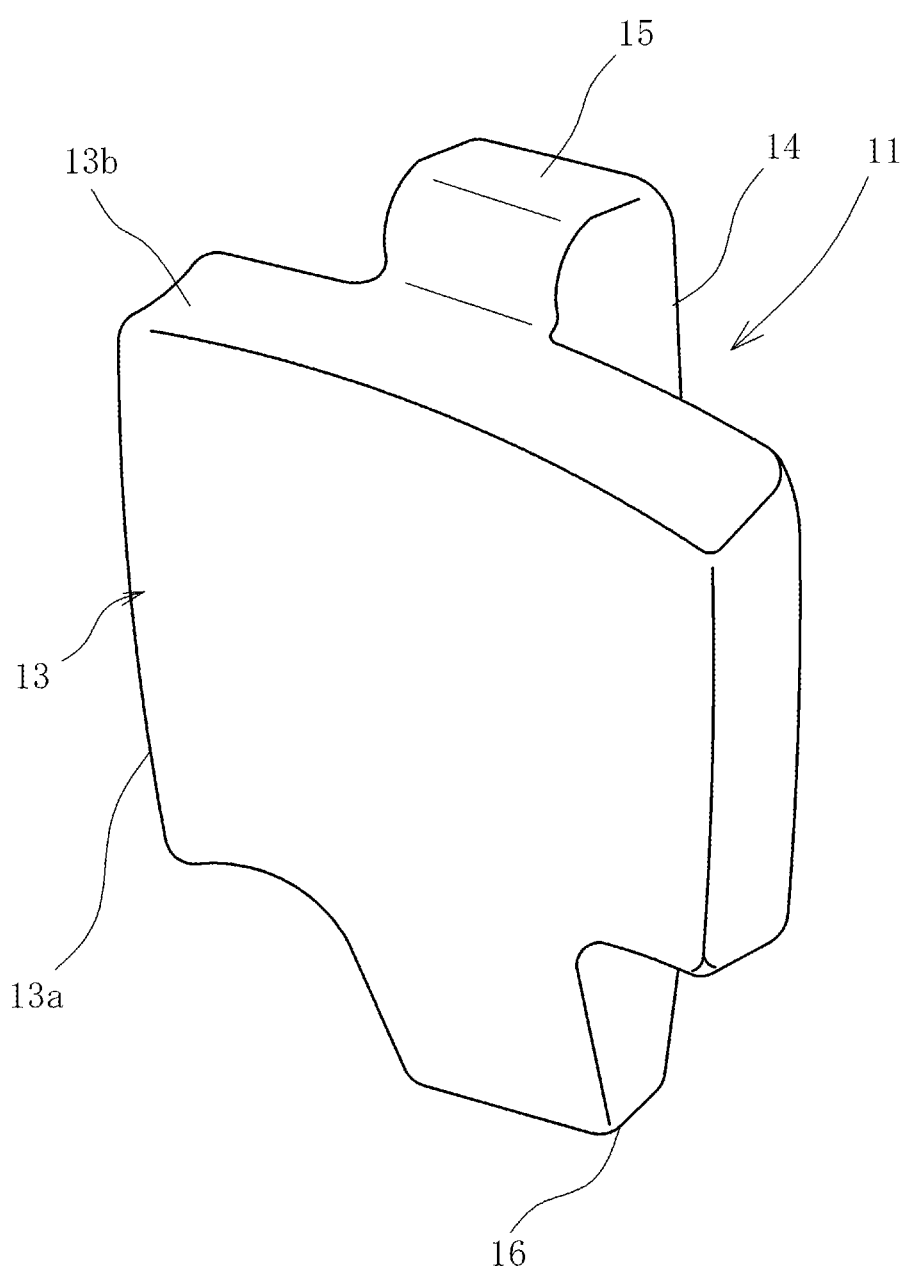
FIG. 6 is a perspective view of the resistor.
Figure 7:
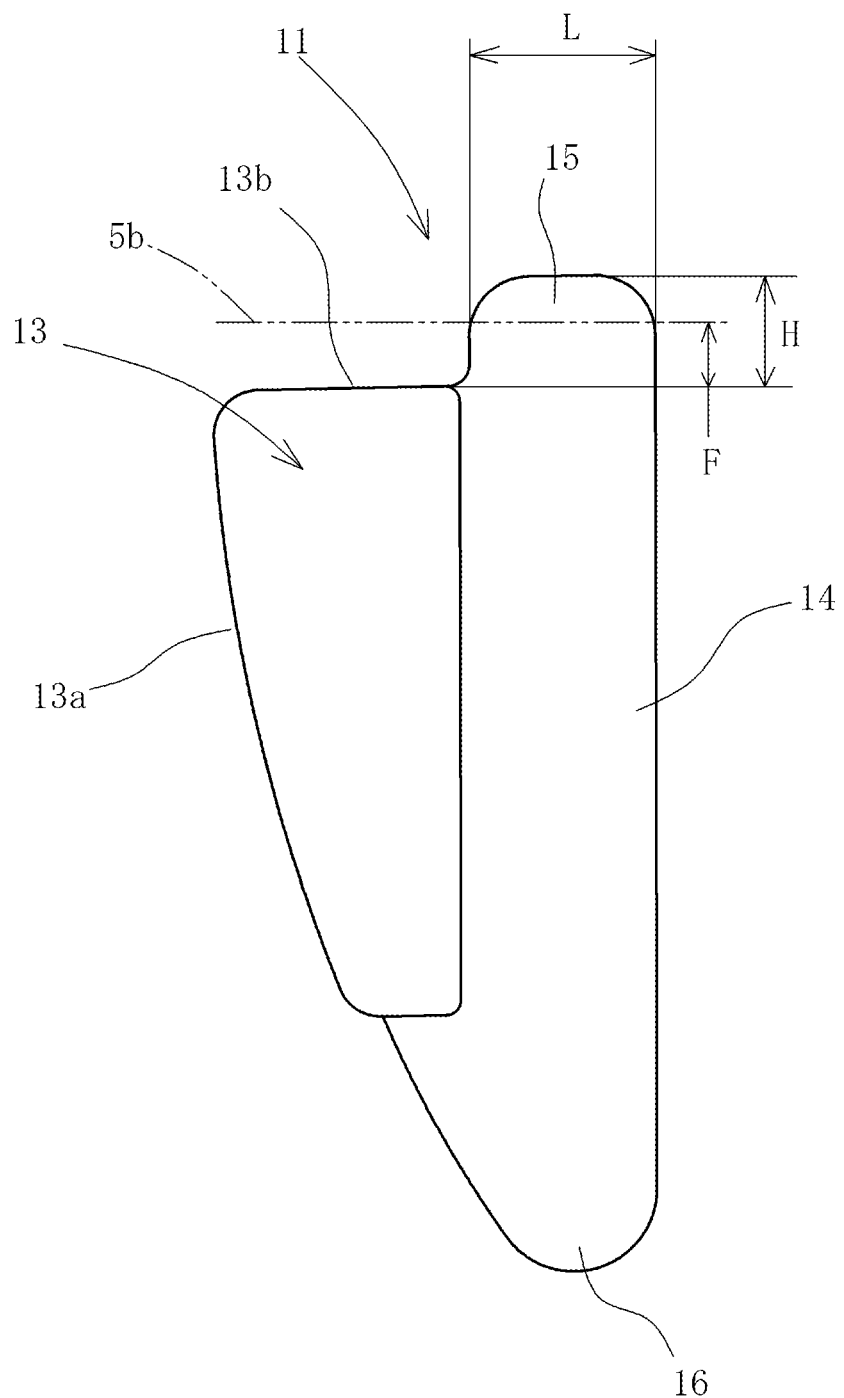
FIG. 7 is a side view of the resistor.

FIG. 5 is an enlarged view of a region around one of resistors 11 in FIG. 3, FIG. 6 being a perspective view of the resistor 11, and FIG. 7 is a side view of the resistor 11. As seen in these drawings, the resistor 11 is made of proper elastic material having elasticity, such as rubber or the like and formed separate from the insulator 8.

The resistor 11 comprises an extension 13 in the circumferential direction which forms the regulation gap 12 in cooperation with the outer peripheral surface of the insulator 8, and an engaging projection 14 which is fitted in such a manner as to be inserted into the engaging recess 24. The engaging projection 14 is a portion to be tightly fitted by insertion in the engaging recess 24, and is formed into a rib-shaped projection integrally projecting radially outwardly from an intermediate portion in the circumferential direction of the outer peripheral surface of the circumferential extension 13. The circumferential extension 13 is provided so as to protrude in the circumferential direction of the insulator 8 from the engaging projection 14, whereby the resistor 11 is formed in substantially a T-shape or Y-shape when viewed in the direction of Z (FIG. 3).

As shown in FIG. 5, an inner peripheral surface 13a of the circumferential extension 13 is curved in a circular arc shape along the outer periphery of the insulator 8 while maintaining a gap of a size C and extends in a size of width W along an outer periphery of the upper surface of the insulator 8 in the circumferential direction. The numerical values of these C and W may be freely determined in response to the situation. In addition, the length L of the engaging projection 14 may be determined freely, and the depth D of engagement to be engaged in the engaging recess 24 may also be determined freely. In this embodiment, L≈D.

Any of these numerical values is an essential control element in anti-resonance. For example, when changing the depth D and adjusting a space E of the engaging recess 24 in the widening or narrowing direction, the strength and weakness of the support can be controlled to change the spring of the support portion.

Moreover, when changing large and small the thickness T of the engaging projection 14, the strength and weakness can be controlled to change the spring of the support portion. In addition, when changing the thickness of the rib 23, the spring of the support portion can also be controlled.

For example, by changing the depth D and the width E of the engaging projection 14 (the width of the engaging recess), the bearing capacity against the resistor 11 is also changed. Further, by changing the length L and the radial width (thickness) of the circumferential extension 13, the size C can be adjusted.

The control methods relative to the gap C of the regulation gap 12 of the resistor 11, the thickness T of the engaging projection 14 and the length W of the circumferential extension 13 are given in a table 1 below.

The width and narrowness of the gap C of the regulation gap 12 are reflected in increase and decrease of resistance thereby having the remarkable influence upon the resonance efficiency and the resonance frequency.

Similarly, the thickness T of the engaging projection 14 changes the spring constant of the resistor 11 so as to increase or decrease the resistance thereby having the influence upon the inverted type peculiar resonance. The length of the width W also is adjusted to change the length of the regulation gap 12 as a restriction channel so as to increase or decrease the resistance thereby having the influence upon the inverted type peculiar resonance. In addition, the peak value and the peak frequency decrease with increase in resistance.

TABLE 1

| Adjustment item | Peak Value | Peak Frequency |
| --- | --- | --- |
| Narrow a gap (C) | Decrease | Decrease |
| Widen a gap (C) | Increase | Increase |
| Thicken a Thickness (T) | Decrease | Decrease |
| Thin a thickness (T) | Increase | Increase |
| Lengthen a width (W) | Decrease | Decrease |
| Shorten a width (W) | Increase | Increase |

As shown in FIGS. 6 and 7, an upper portion of the engaging projection 14 is formed with an upper end portion 15 projecting upwardly above the circumferential extension 13 and comes in contact with a lower surface of the outer peripheral portion of the partition member 5. A lower end portion 16 of the engaging projection 14 is united with a lower end portion of the circumferential extension 13 thereby coming in contact with the lowermost portion 21.

A projecting height H of the upper end portion 15 is larger than a space F between an upper surface 13a of the circumferential extension 13 and a lower surface of an outer peripheral portion 5b of the partition member 5 (FIG. 7). Therefore, the upper end portion 15 is compressed by the outer peripheral portion 5b while the lower end portion 16 is also compressed by the lowermost portion 21 so that the engaging projection 14 is held by compression between the outer peripheral portion 5b and the lowermost portion 21.

Figure 8:
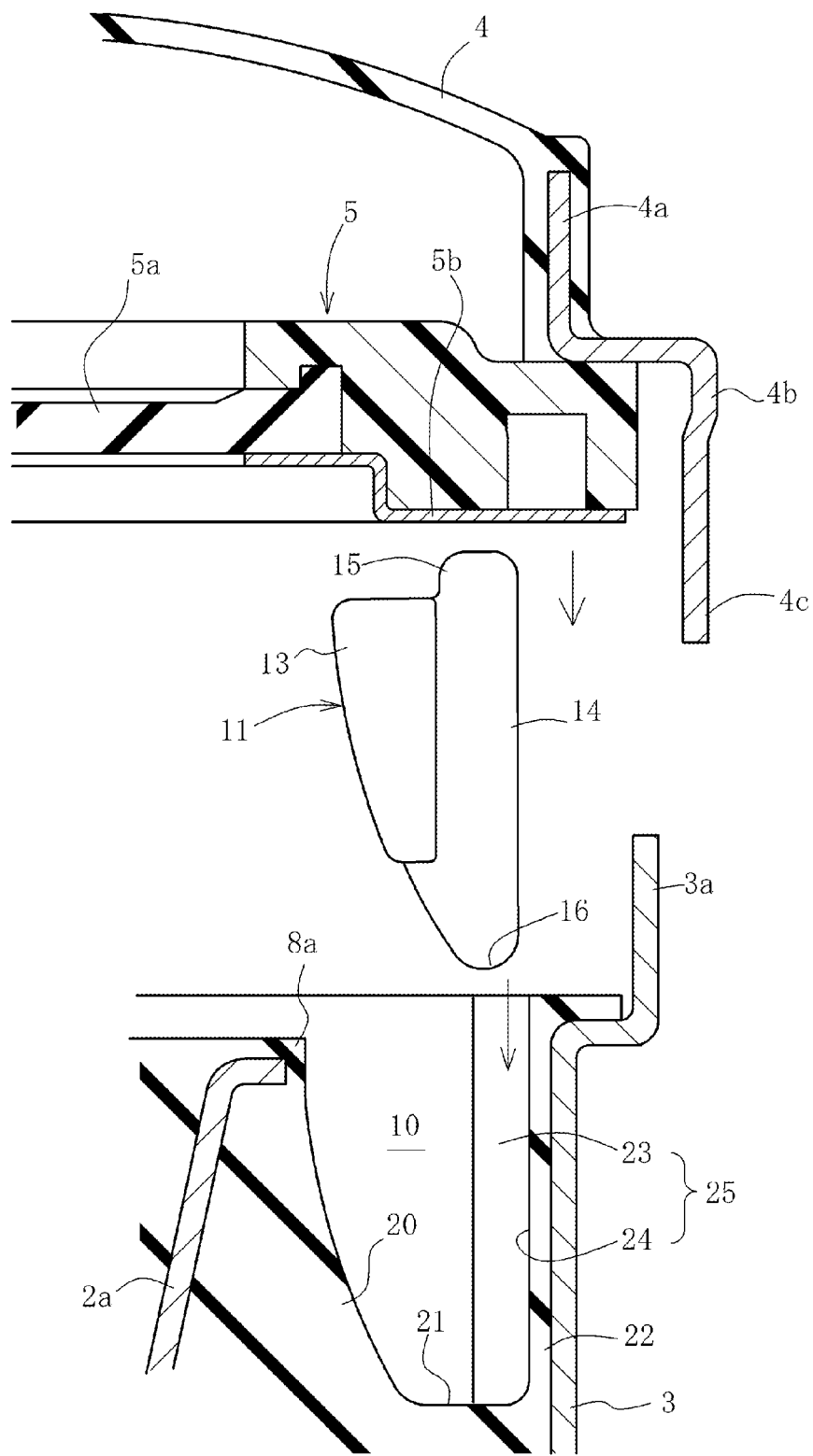
FIG. 8 is a view of assistance in explaining insertion and mounting of the resistor.

FIG. 8 is a view of assistance in explaining the insertion mounting of the resistor 11. At first, the resistor 11 is inserted in the annular recess section 10 with respect to the outer member 3 before attaching the diaphragm 4 and the partition member 5 thereto, and the engaging projection 14 is pressed into and closely engaged with the engaging recess 24 whereby to be elastically held by the ribs 23.

Next, the resistor 11 is covered with the partition member 5 from above. Then, it is covered with the diaphragm 4 in such a manner that the outer peripheral portion 5b comes in contact with the upper end portion 15. When the tip 4c is folded back and fixed by caulking, the outer peripheral portion 5b compresses the upper end portion 15 so that the engaging projection 14 is held by compression between the outer peripheral portion 5b and the lowermost portion 21.

Thus, the engaging projection 14 is also supported by each of the outer peripheral portion 5b and the lowermost portion 21, and the rigidity of the mounting section changes with the compression. The degree of the rigidity of the engaging projection 14 supporting section by this compression has the influence upon the single resonance of the control member and is freely controllable by changing the compression.

The operation of this embodiment will be described hereunder. In FIG. 2, when being inputted in the direction orthogonal to the Z direction, for example in the X direction, the inner mounting member 2 moves in the X direction. Consequently, the liquid within the annular recess section 10 flows in the circumferential direction of FIG. 3 and is restricted by passing through the regulation gap 12 whereby the flow rate is controlled and the resistor 11 functions as the resistance of the liquid flow.

Therefore, the resonance efficiency of the inverted type peculiar resonance is decreased. As a result, the peak of the anti-resonance is decreased and the resonance frequency changes, so that the dynamic characteristic in the intermediate and high frequency ranges can be improved.

Figure 9:
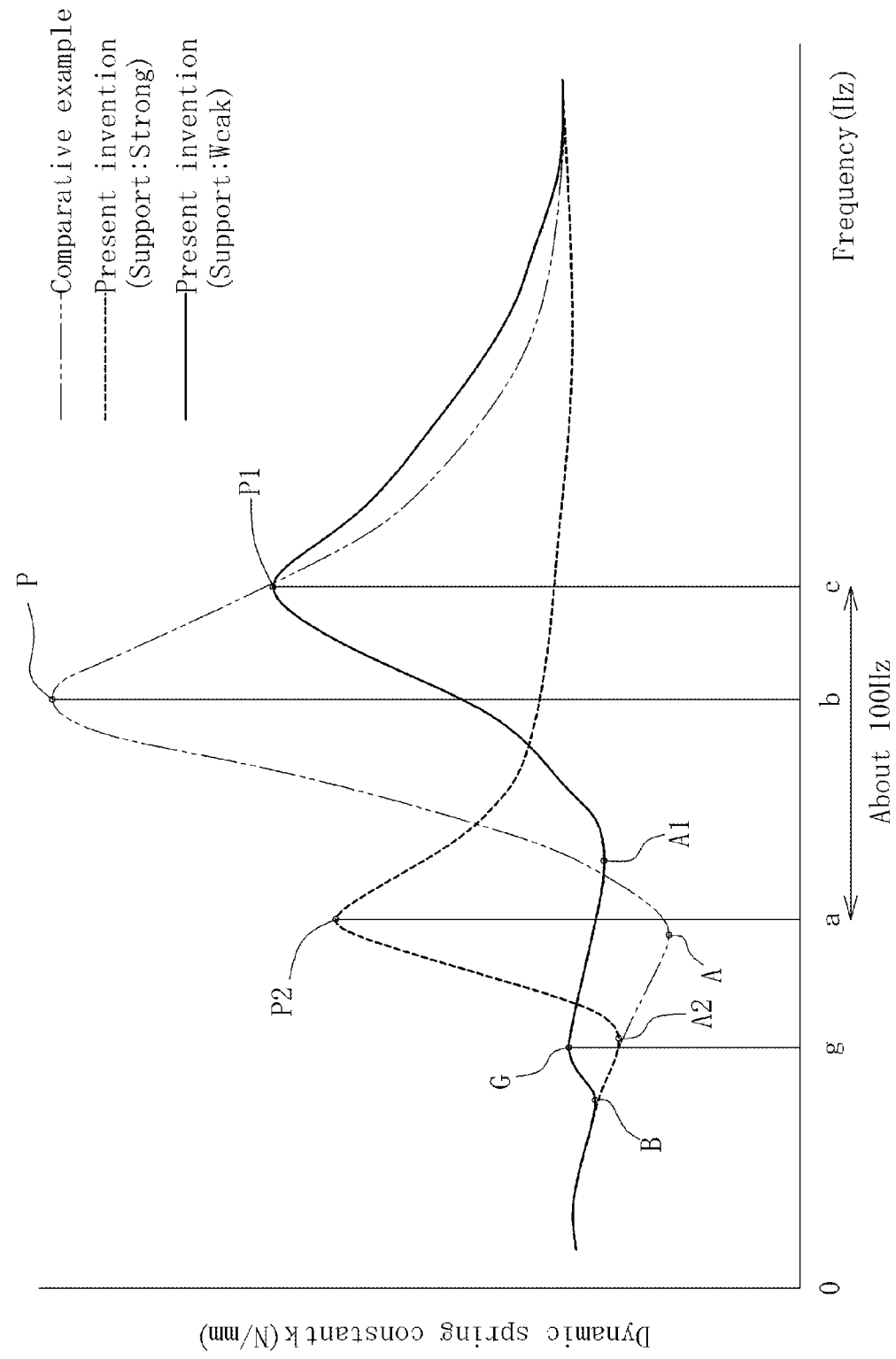
FIG. 9 is a graph showing a dynamic characteristic according to the first embodiment.

FIG. 9 is a graph showing the dynamic characteristic, in which the vertical axis is the dynamic spring constant and the horizontal axis is the frequency. A phantom line is a reference example in which the resistor is fixed on the partition member, different from the engagement of the present invention. When the shape and size of the resistor and the regulation gap are fixed, there is shown a fixed dynamic characteristic like the phantom line, such that inverted type peculiar resonance A occurs in the intermediate and high frequency ranges, and the high peak P of the anti-resonance occurs at a frequency b on the side of higher frequency.

On the other hand, in the present invention, the same resistor in shape, material, size and regulation gap as a comparative example is used and supported while being engaged by insertion. A solid line of the graph is the case in the present invention of having weakened the support of the elastic support section 25 to a degree that there occurs the single resonance by which the resistor 11 resonates solely due to the internal pressure fluctuation of the primary liquid chamber 6. In this case, a bottom B (a minimum value of the dynamic spring curve) by the single resonance occurs at a lower frequency on the lower frequency side than the occurrence of inverted type peculiar resonance A1, and a peak G of the anti-resonance occurs at a frequency g (g<b).

The inverted type peculiar resonance A1 is influenced by the formation of the bottom B and the peak G by the single resonance such that the resonance efficiency is lowered on the higher frequency side than the inverted type peculiar resonance A of the comparative example. Consequently, the anti-resonance forms a peak P1 which is greatly lowered as against a peak P of the comparative example, at a frequency c higher than the frequency b (b<c).

This frequency c means that it moves to the higher frequency side than the comparative example without resistance, and shows that the dynamic characteristic was able to be improved in the wider range such that the peak slides onto the higher frequency side irrespective of providing the resistance and the peak P1 is greatly lowered by the resistance as against the peak P of the comparative example.

A dotted line in the graph is the case of having strengthened the support of the elastic support section 25 to a degree that the single resonance does not occur. In this case, inverted type peculiar resonance A2 which is low in the resonance efficiency occurs on the lower frequency side than the inverted type peculiar resonance A in the comparative example, and the anti-resonance thereof creates a peak P2 of the anti-resonance (P2<P1<P) at a frequency a lower than the frequency b (a<b<c), whereby it is also possible to decrease the peak of the anti-resonance. A space between the frequency a and the frequency c may be about 100 Hz wide, for example, so that the fluid resonance can be broadened into the range corresponding to this frequency range.

Further, the bottom B and the peak G in FIG. 9 are based on the single resonance of the resistor 11. Since the resistor 11 is formed of an elastic body and the engaging projection 14 is elastically supported by the elastic support section 25, the resistor 11 is able to resonate by itself by the fluid flow in the annular recess section 10 so as to create the single resonance. This single resonance is configured to create the bottom B and the peak G at the low frequency side of the inverted type peculiar resonance.

In this way, when the single resonance of the resistor is created at the low frequency side of the inverted type peculiar resonance, the decrease in the dynamic spring can be achieved in the intermediate and high frequency ranges so that the effective vibration isolation can be achieved.

The control for the single resonance by the resistor 11 can be carried out by adjusting the support strength through the engaging structure in the elastic support section 25. In addition, the control can be freely carried out by changing the material (the elastic coefficient), shape, size and length (FIG. 5) of the resister 11 itself and by adjusting the support strength as above or the like.

In the present invention, different from the prior art (the comparative example) that the resistor is fixed, since the resistor 11 is detachably mounted by engagement, the resonance efficiency and the resonance frequency are able to be controlled, so that the noise due to the anti-resonance of the inverted type peculiar resonance in the intermediate and high frequency ranges can be reduced.

Moreover, although the resistor 11 bears the repeated loads by the liquid flow, the elastic support section 25 has the fitting structure between the engaging projection 14 and the engaging recess 24, and the engaging projection 14 is freely movable in the engaging recess 24. Therefore, even if the insulator 8 is deformed and comes in contact with the resistor 11 thereby to extend and compress the same, there is no stress concentration in the elastic support section 25 which supports the resistor 11, whereby the durability of the resistor 11 is improved.

Like this, since it is possible to control the resonance by such a small alteration as to change the strength for supporting the resistor 11, the control of the inverted type peculiar resonance can be easily performed by such a simple operation as to fit or engage the resistor 11 and to replace the same, whereby the degree of freedom can be increased. In addition, the adjustment of the support strength is able to be performed merely by changing the thickness T (FIG. 5) of the engaging projection 14 for example, the change of only the resistor 11 will be sufficient in this case. The resonance control by the resistor 11 is changed freely by adjusting the relative width and the relative length of the regulation gap 12, and the supporting strength (the strength of the spring of the engaging projection 14, etc.) in the elastic support section 25.

By the way, since the resistor 11 is integrally provided with the circumferential extension 13 protruding in a circular arc shape from the engaging projection 14 in the circumferential direction of the insulator 8, the circumferential projection 13 can be extended long in the predetermined width W in the circumferential direction of the insulator 8. Accordingly, the length of the regulation gap 12 formed as the gap C between the insulator 8 and the resistor 11 can be adjusted in the circumferential direction.

In addition, when adjusting the length L (FIG. 5) of the resistor 11 in the radial direction of the insulator 8, the width of the regulation gap 12 can be freely adjusted. Moreover, it is possible to adjust the flexibility of the engaging projection 14, namely, the spring in the case where the engaging projection 14 oscillates in the circumferential direction within the engaging recess 10 such as to resonate solely.

Further, the resistor 11 is separated from the partition member 5, the insulator 8 and the lining layer 22, the engaging projection 14 can be easily attached to the engaging recess 24 by engagement in the detachable fashion. Thus, since the replacement of the resistor 11 is also easily performed, the dynamic characteristic can be varied by properly replacing one with the another that is different in materials, shapes, sizes, and the like. In the case where the resistor 11 is provided in pairs, varying combinations of each of the resistors 11 can be employed. Thus, the degree of resistance can be adjusted when the resistor 11 is replaced freely with another having the predetermined performance in accordance with the specification.

Further, the fluid resonance can be controlled by adjusting the strength of the support while adjusting the degree of fastening by the outer peripheral portion 5b and the lowermost portion 21. When the upper end portion 15 and the lower end portion 16 are strongly fastened by the outer peripheral portion 5b and the lowermost portion 21, the resistor 11 is hard to be deformed in the circumferential direction, whereby to provide the same support as the strong support in FIG. 9. On the contrary, when the fastening is weakened, the resistor 11 is easy to be deformed in the circumferential direction, whereby to provide the same support as the weak support in FIG. 9.

Accordingly, the replacement of the resistor 11 allows the inverted type peculiar resonance to be controlled by adjusting the gap C, the width W, the length L, the thickness T, the interference relative to the upper end portion 15 and the lower end portion 16, and the like, whereby the degree of freedom of control is increased. In addition, since the resistor 11 is formed of a single body, the manufacture is facilitated and the handling is simplified.

Figure 10:
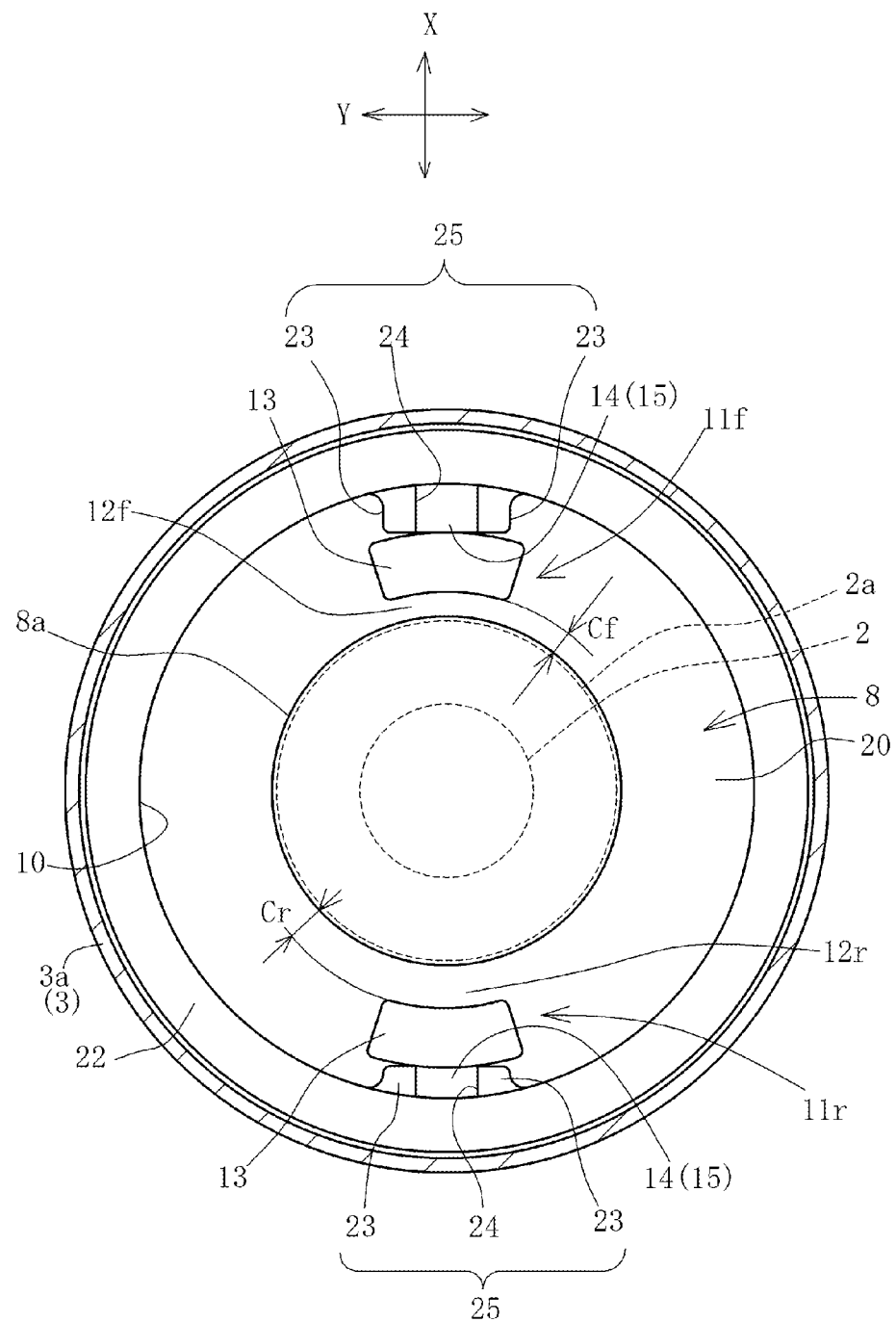
FIG. 10 is a view corresponding to FIG. 3, according to a second embodiment.

Next, the second embodiment will be described. FIG. 10 is a view corresponding to FIG. 3, showing an example in which front and rear regulation gaps 12 are varied. In this embodiment, the resistors are arranged in front and in the rear in the X direction. Hereinafter, in order to simplify an understanding, front side components will be referred to as a front resistor 11f and a front regulation gap 12f, and rear side components will be referred to as a rear resistor 12r and a rear regulation gap 12r.

Moreover, a gap Cr of the rear regulation gap 12r is configured to be greater than a gap Cf of the front regulation gap 12f. When a regulation gap of a comparative example having the same gap in front and in the rear to be referred to later is C, the relation is Cf<C<Cr. Then, the insulator 8 moves backwardly and a backward capacity of the annular recess section 10 is decreased. As a result, the liquid flow occurs from the rear side to the front side thereby to create the fluid resonance at the rear side. This rear fluid resonance is influenced by the resistance of the rear regulation gap 12r.

Next, when the direction of the vibration is reversed, the insulator 8 moves forwardly and a forward capacity of the annular recess section 10 is decreased, so that the liquid flow occurs from the front side to the rear side thereby to create the fluid resonance at the front side. This front fluid resonance is influenced by the resistance of the front regulation gap 12f.

Each of the front and rear fluid resonance has a different resonance efficiency and a different resonance frequency, since the liquid amounts passing through the front and rear regulation gaps 12f, 12r are different from each other due to the difference between the front regulation gap 12f and the rear regulation gap 12r.

Figure 11:
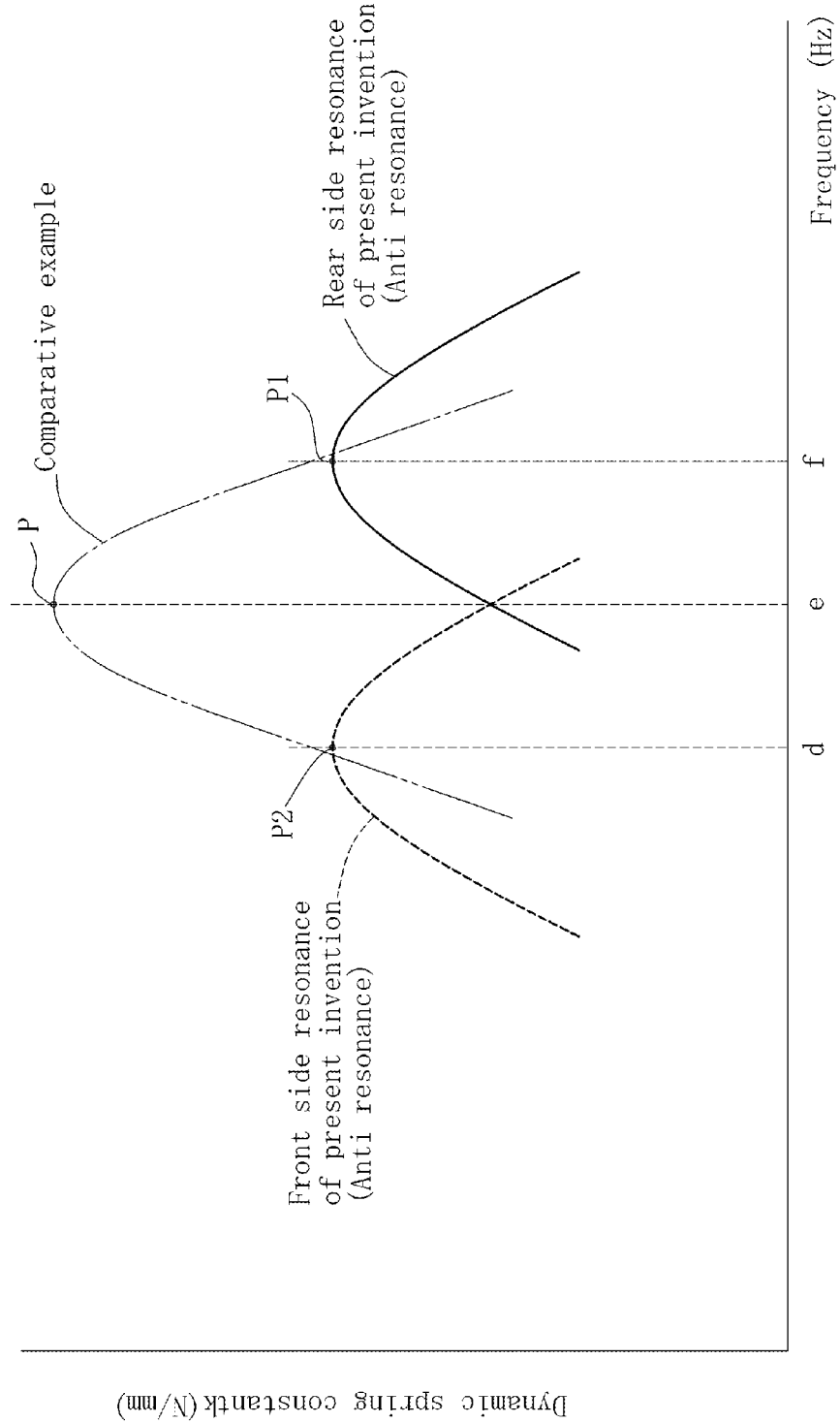
FIG. 11 is a graph showing a dynamic characteristic according to the second embodiment.

FIG. 11 is a graph of the dynamic characteristic showing this fluid resonance. In comparison with a comparative example having the same regulation gaps C in front and in the rear, that a peak of the anti-resonance due to the inverted type peculiar resonance occurs at a frequency e, a peak of the anti-resonance due to the inverted type peculiar resonance in the rear regulation gap 12r of the present invention shown by a solid line occurs at a frequency f which is higher than e. A dotted line shows the anti-resonance due to the inverted type peculiar resonance in the front regulation gap 12f of the present invention, and a peak occurs at a frequency d which is lower than the frequency e.

Since the inverted type peculiar resonance of the comparative example is the same fluid resonance in front and in the rear, the same frequencies are doubled thereby to create one strong fluid resonance, and the peak of the anti-resonance occurs at the high frequency e.

In comparison with this, since the resonance frequencies are different in the fluid resonance in front and in the rear, the fluid resonance in front and in the rear occurs separately without being doubled and is reduced by about half in magnitude. Consequently, the peaks of the anti-resonance in the fluid resonance in front and in the rear are lower than that of the comparative example, and the frequency e is put between the frequencies d and f of each of the peaks.

Accordingly, the peaks of the anti-resonance can be lowered by the fluid resonance which is low and different in the resonance efficiency in front and in the rear, and the frequency range corresponding to the range between the frequencies d and f can be broadened as the fluid resonance range.

By the way, the adjustment for varying the fluid resonance in front and in the rear can be done not only by varying the regulation gap 12, but also by varying the length of protrusion in the circumferential direction of the circumferential extension 13, the length of the inner peripheral surface 13a in the Z direction, and materials, dimensions, etc. of the resistor 11. In addition, it is possible by adjusting the fastening strength as referred to above.

The arrangement in front and in the rear of the resistor 11 is an example. It is possible to have the resistors arranged in the optional direction such as the left and right direction (the Y direction) or the like.

Figure 12:
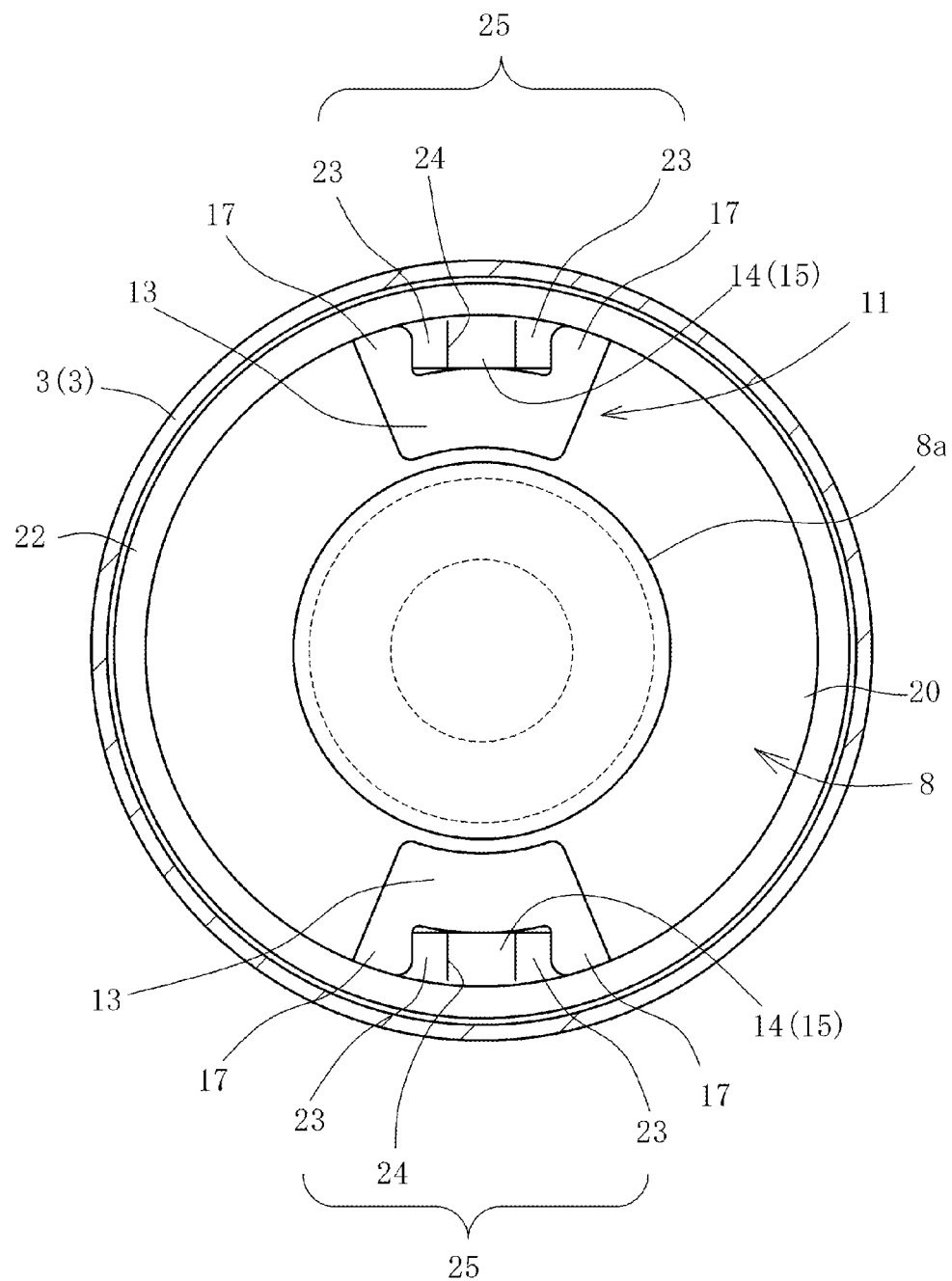
FIG. 12 is a view corresponding to FIG. 3, according to a third embodiment.
Figure 13:
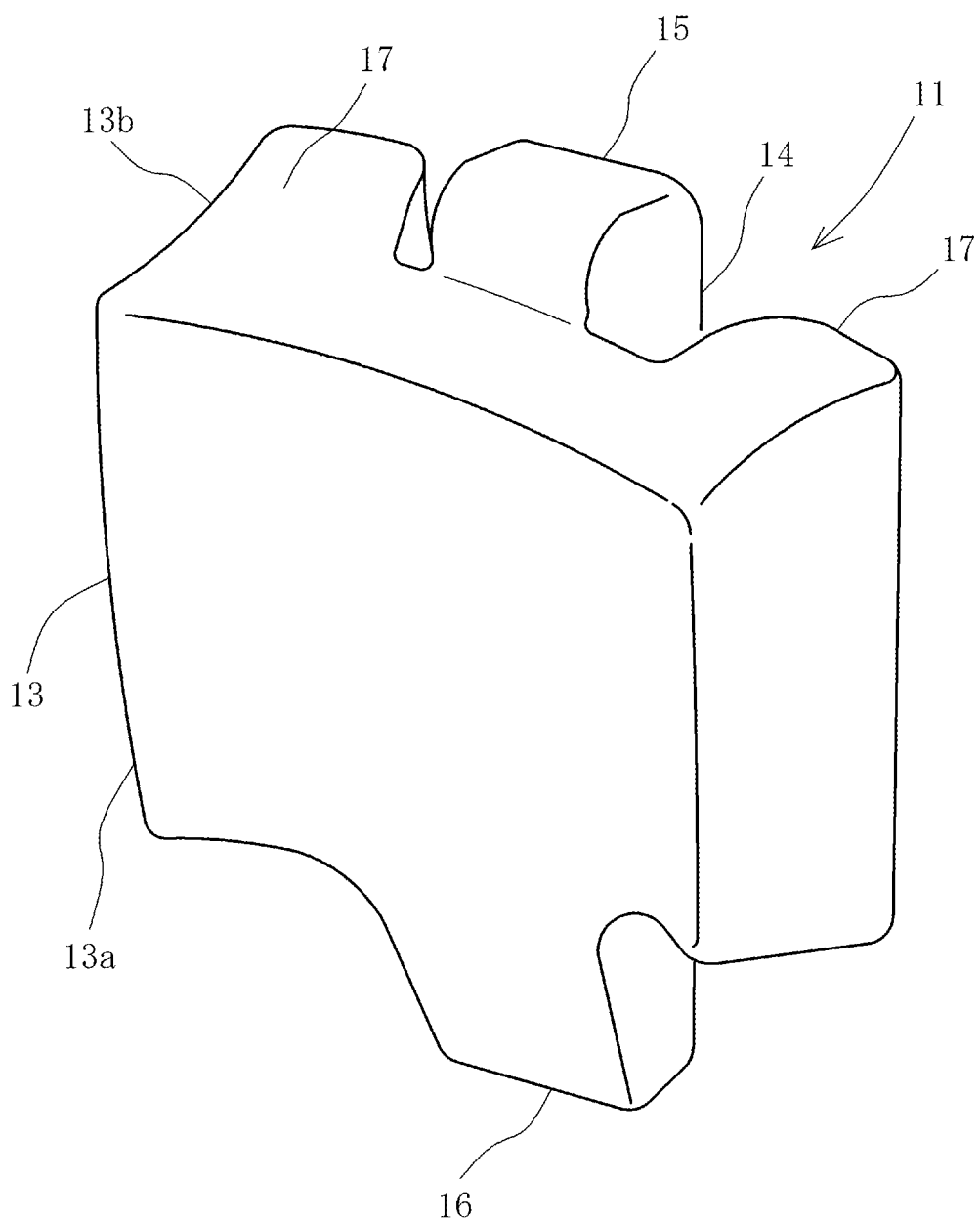
FIG. 13 is a perspective view of a resistor according to the third embodiment.

FIGS. 12 and 13 show a third embodiment, in which a stopper is formed integral with the resistor 11. FIG. 12 is a view similar to FIG. 3, and FIG. 13 is a perspective view of the resistor 11. In these drawings, the stoppers 17 which project outwardly in the radial direction are formed integral with both ends in the circumferential direction of the circumferential extension 13.

The stoppers 17 project radially outwardly while placing the engaging projection 14 therebetween, and come in contact with the inner surface of the outer member 3 (in this embodiment, in contact with the inner surface through the lining layer 22).

According to this structure, when the inner mounting member 2 and the insulator 8 are displaced excessively in the radial direction, the upper portion of the insulator 8 comes in contact with the resistor 11 while vanishing the regulation gap 12, and the resistor 11 allows the stoppers 17 to contact the outer member 3, whereby to stop a further movement of the inner mounting member 2 and the insulator 8. Thus, the resistor 11 is able to effectively function as a stopper. In addition, since the resistor 11 is a single elastic body, adhesive deterioration as in the case of bonding by baking to the partition member does not occur, and it is possible to function sufficiently as a stopper which bears a heavy load.

By the way, it is to be understood that the present invention is not limited to each of the above specific embodiments, and that various changes and modifications may be made in the invention without departing from the spirit and scope thereof. For example, the engaging projection is not necessarily provided on the side of the resistor 11 and may be provided on the side of the lining layer 22. In this case, the engaging recess is provided on the resistor 11. In addition, these are not limited to the projection and the recess or groove. There may be a round bar shaped boss and a round hole into which the boss is fitted.

Further, the engaging section may be provided between the resistor 11 and the outer peripheral portion of the insulator 8 instead of being provided between the resistor 11 and the lining layer 22. In this case, the regulation gap 12 is formed between the resistor 11 and the lining layer 22.

Furthermore, the resistor 11 is not necessarily formed of an elastic body and may be a rigid body of rigid metal or resin. In this case, the stopper 17 is allowed to be deformed by the elasticity on the side of the lining layer 22, whereby the efficiency of the inverted type peculiar resonance can be reduced.

In addition, the liquid sealed mount of the present invention may also be applied to various kinds of liquid sealed mounts for a suspension, etc. other than the liquid sealed engine mount.

What is claimed is:

1. An inverted liquid sealed mount comprising:
    an inner member being mounted on one of a vibration source side member and a vibration receiving side member;
    an outer member surrounding the inner member and being mounted on the other of the vibration source side member and the vibration receiving side member;
    an insulator of a circular truncated cone shape covering an opening section of one end of the outer member and elastically connecting the inner member and the outer member;
    a liquid chamber being formed between the insulator and a diaphragm which covers an opening section of the other end of the outer member;
    a partition member separating the liquid chamber into a primary liquid chamber and a secondary liquid chamber;
    an orifice communicating between the primary liquid chamber and the secondary liquid chamber; and
    a top of the insulator projecting into the primary liquid chamber in an input direction of vibration which pressurizes the primary liquid chamber;
    wherein resistors are arranged in an annular recess section formed around the insulator within the primary liquid chamber and narrows a portion of the annular recess section so as to form a regulation gap, and the resistors are mounted by engagement with elastic support sections provided within the primary liquid chamber,
    the resistors and the elastic support sections are detachably engaged by an interference fit between engaging projections and engaging recesses as relatively movable, and wherein one of the engaging projections and the engaging recesses are provided on the resistors while the other is provided on the elastic support section formed within the primary liquid chamber, the engaging recesses are provided with vertical grooves extending in the upward and downward direction and fitted by insertion with engaging projections, the resistors are formed separate from the insulator and the partition member and arranged partially in the circumferential direction of the annular recesses, the regulation gap is provided partially in the liquid channel in the circumferential direction of the annular recess section by the resistors, and the regulation gap is changed and fluid resonance in the annular recess is controlled by changing the resistors.

2. The inverted liquid sealed mount according to claim 1, wherein the resistors are supported by being held between the partition member and the insulator such that the resistors come in contact at an end thereof with the partition member and at the other end thereof with a portion of the insulator located in a bottom portion of the annular recess section, in the direction of a mount axis.

3. The inverted liquid sealed mount according to claim 2, wherein the resistors are integrally provided with the engaging projections relative to the elastic support sections, and with a circumferential extension protruding from each of the engaging projections in the circumferential direction of the annular recess section, and wherein the circumferential extension extends in a circular arc shape along an outer periphery of the insulator.

4. The inverted liquid sealed mount according to claim 2, wherein the resistors are made of an elastic body, and a bottom and peak of a dynamic spring curve occur in the vicinity of peculiar resonance to an inverted type when the resistors resonate by an internal pressure fluctuation created within the primary liquid chamber due to deformation of the insulator.

5. The inverted liquid sealed mount according to claim 2, wherein each of the resistors is integrally provided with stopper portion which contacts the outer member side.

6. The inverted liquid sealed mount according to claim 2, wherein the resistors are provided in pairs at opposite sides in a radial direction across the insulator, and a gap of one regulation gap is different from that of the other regulation gap.

7. The inverted liquid sealed mount according to claim 1, wherein the resistors are integrally provided with the engaging projections relative to the elastic support sections, and with a circumferential extension protruding from each of the engaging projections in the circumferential direction of the annular recess section, and wherein the circumferential extension extends in a circular arc shape along an outer periphery of the insulator.

8. The inverted liquid sealed mount according to claim 7, wherein the resistors are made of an elastic body, and a bottom and peak of a dynamic spring curve occur in the vicinity of peculiar resonance to an inverted type when the resistors resonate by an internal pressure fluctuation created within the primary liquid chamber due to deformation of the insulator.

9. The inverted liquid sealed mount according to claim 7, wherein each of the resistors is integrally provided with a stopper portion which contacts the outer member side.

10. The inverted liquid sealed mount according to claim 7, wherein the resistors are provided in pairs at opposite sides in a radial direction across the insulator, and a gap of one regulation gap is different from that of the other regulation gap.

11. The inverted liquid sealed mount according to claim 1, wherein the resistors are made of an elastic body, and a bottom and peak of a dynamic spring curve occur in the vicinity of peculiar resonance to an inverted type when the resistors resonates by an internal pressure fluctuation created within the primary liquid chamber due to deformation of the insulator.

12. The inverted liquid sealed mount according to claim 11, wherein each of the resistors is integrally provided with a stopper portion which contacts the outer member side.

13. The inverted liquid sealed mount according to claim 1, wherein the resistors are integrally provided with a stopper portion which contacts the outer member side.

14. The inverted liquid sealed mount according to claim 1, wherein the resistors are provide in pairs at opposite sides in a radial direction across the insulator, and a gap of one regulation gap is different from that of the other regulation gap.

15. The inverted liquid sealed mount according to claim 1, wherein the resistors are made of an elastic body, and a bottom and peak of a dynamic spring curve occur in the vicinity of peculiar resonance to an inverted type when the resistors resonate by an internal pressure fluctuation created within the primary liquid chamber due to deformation of the insulator.

* * * * *